United States Patent
Chen et al.

(10) Patent No.: US 6,842,846 B2
(45) Date of Patent: Jan. 11, 2005

(54) INSTRUCTION PRE-FETCH AMOUNT CONTROL WITH READING AMOUNT REGISTER FLAG SET BASED ON PRE-DETECTION OF CONDITIONAL BRANCH-SELECT INSTRUCTION

(75) Inventors: Pao-Lung Chen, Hsinchu (TW); Chen-Yi Lee, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 431 days.

(21) Appl. No.: 10/024,844

(22) Filed: Dec. 18, 2001

(65) Prior Publication Data

US 2002/0144087 A1 Oct. 3, 2002

(30) Foreign Application Priority Data

Apr. 3, 2001 (TW) .................................... 90218189 U

(51) Int. Cl.[7] .............................................. G06F 9/30
(52) U.S. Cl. ...................... 712/207; 712/206; 712/235; 713/320
(58) Field of Search ................................ 712/206, 207, 712/235, 237; 713/320

(56) References Cited

U.S. PATENT DOCUMENTS

| 5,687,339 A | 11/1997 | Hwang ........................ 712/207 |
| 5,870,616 A | * 2/1999 | Loper et al. ................ 713/324 |
| 6,631,464 B1 | * 10/2003 | Mori et al. ................. 712/234 |

* cited by examiner

*Primary Examiner*—Kenneth S. Kim

(57) ABSTRACT

An architecture of method for fetching microprocessor's instructions is provided to pre-fetch and pre-decode a next instruction. If the instruction pre-decoded is found a conditional branch instruction, an instruction reading-amount register is set for reading two instructions next to the current instruction in the program memory, or one is read instead if the next instruction is found an instruction other than the conditional branch one so as to waive reading of unnecessary program memory and thereby reduce power consumption.

7 Claims, 6 Drawing Sheets

INSTRUCTION PRE-FETCH AMOUNT CONTROL WITH READING AMOUNT REGISTER FLAG SET BASED ON PRE-DETECTION OF CONDITIONAL BRANCH-SELECT INSTRUCTION

FIELD OF THE INVENTION

This invention relates to an architecture of method for fetching microprocessor's instructions, and more particularly to the pre-fetching of program instructions in the event of a conditional branch for reducing power consumption.

BACKGROUND OF THE INVENTION

The effectiveness of a computer is often evaluated based on its processing speed of an instruction. A single-cycle instruction is an instruction that can be executed and completed within a cycle and in the mean time allows a microprocessor to pre-fetch the next instruction. However, not all instructions in a program are single cycle instructions. How to reduce the processing time of an instruction has been a great concern to the designers of computer processors.

When executing the general logic instructions of a program, a microprocessor is supposed to run an instruction and pre-fetch the next one totally in an instruction cycle by adding value 1 to a program counter (PC). The next instruction can thus be executed in the next cycle. Therefore, single cycle instructions can be executed consecutively. As shown in FIG. 1, while instruction N is executed instruction N+1 is also pre-fetched for execution in the next cycle. However, if an instruction executed is a "CALL" instruction, the pre-fetched instruction would not be executed in the next cycle because the "CALL" instruction is supposed to jump to a different address specified in the "CALL" instruction. To accomplish this instruction jump, the PC will be added with a discrete variable "M" specified In the "CALL" instruction instead of the usual 1 to make the PC value discontinuous. Before so doing, the program would need a no operation (NOP) instruction for loading the correct address of the variable "M" to the PC for fetching and executing the instruction called by the "CALL" instruction. The insertion of the no operation requires at least one more instruction cycle that usually deteriorates the microprocessor's effectiveness.

SUMMARY OF THE INVENTION

In order to overcome the inefficiency of the additional instruction cycle required, the procedure of an existing method for fetching instructions shown in FIG. 2 is to pre-fetch instructions at address N+1 and N+2 while the instruction at address N is executed, and at this moment, the method also decodes the N+1 instruction. In case the N+1 instruction is found not a general logic instruction, such as a "CALL" instruction for example, the next instruction to be executed will be replaced by a "NOP" instruction for loading the correct address of the variable "M" specified in the "CALL" instruction and pre-fetching the instructions at address "M" and "M"+1 so that the called instruction at address "M" will be executed in the next instruction cycle for eliminating the extra cycle to thereby improve the processing effectiveness. As shown in FIG. 2, the prior art always fetches two additional instructions because in the case of a simple conditional branch instruction, the target of the conditional branch instruction can be either one of the following two instructions. The pre-fetching of two instructions continuously while executing the program increases the consumption of power.

Although the efficiency is improved in the above method, more power is consumed during the process of fetching and storing those two instructions and there is a need to further improve the pre-fetching of instructions for reducing power consumption.

The primary object of this invention is to provide a method for fetching microprocessor's instructions. The method which normally pre-fetches a next instruction would pre-fetch and pre-decode two next instructions in case it encounters a conditional branch instruction so as to waive unnecessary reading of program memory and reduce power consumption accordingly.

Another object of this invention is to provide an architecture for practicing the method of fetching microprocessor's instructions. In the process of executing instructions, a processing unit is employed to decode an instruction next to the current one for setting the state of an instruction reading-amount register. If the next instruction is found a conditional branch instruction, both an odd and an even address buffer register are enabled simultaneously for fetching two next instructions, wherein the choice of an immediate one is determined by the processing unit. If the next instruction is not a conditional branch instruction, only one of the address buffer register is enabled for fetching an instruction in order to waive any unnecessary reading of program memory for reducing power consumption.

For more detailed information regarding advantages or features of this invention, at least an example of preferred embodiment will be fully described below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE INVENTION

In general, a program's instructions of computer might be divided into four categories: the general instructions as a first category for execution of general logic instructions; the unconditional branch instructions as a second category; the "CALL" and the "RETURN" instructions as a third category; and the conditional branch instructions as a fourth category.

A next instruction succeeding to the current one might have several alternatives, including: an only address made by adding 1 to the present PC (program counter) value of the first category; a new and only address contained in the current instruction of the second category; a new and only address contained in the current instruction or a return address found in a stack of the third category; or an address at PC+1 or PC+2 of the fourth category which is to be determined by a processing unit. Therefore, when a succeeding instruction is decoded as a conditional branch instruction, a method of this invention for fetching microprocessor's instructions pre-fetches and pre-decodes two sequential instructions and chooses to execute one of those alternatives.

Figure 1:
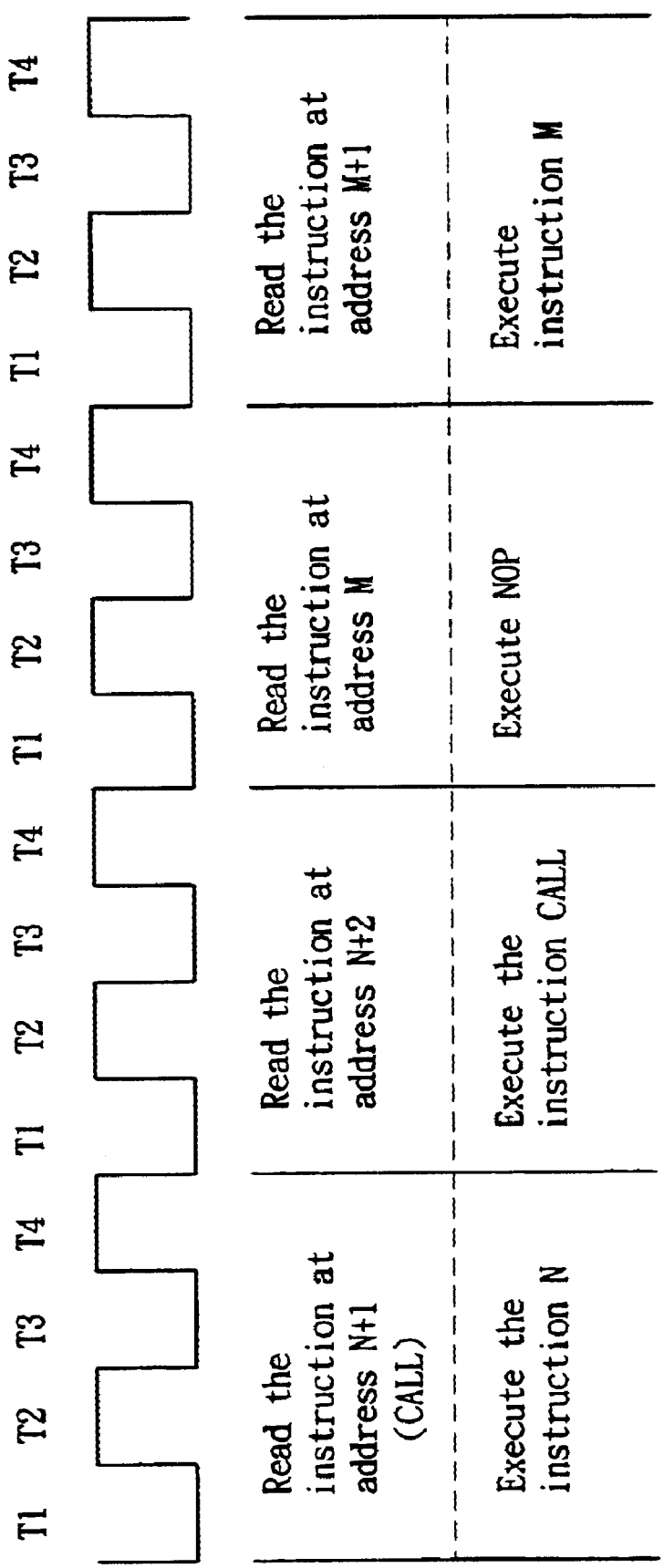
FIG. 1 is a schematic view of timing chart of a conventional method for fetching microprocessor's instructions.
Figure 2:
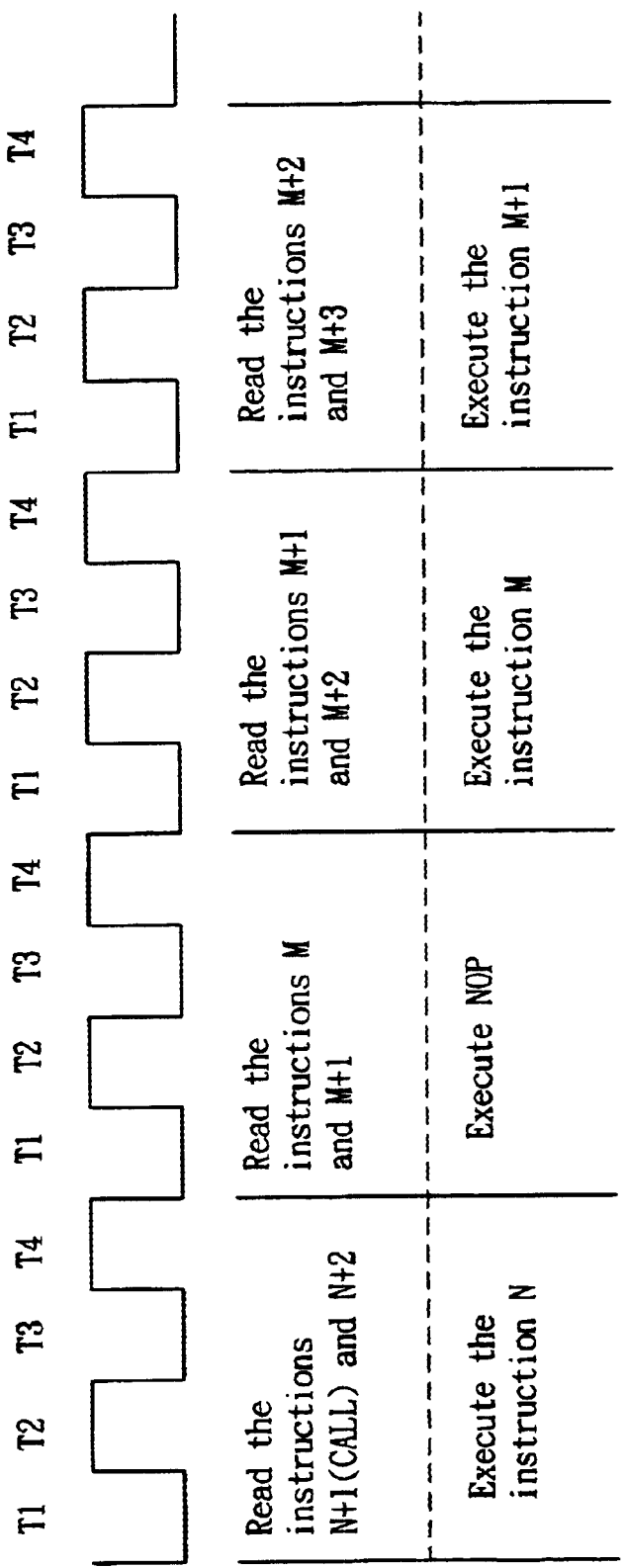
FIG. 2 is another schematic view of timing chart of a conventional method for fetching microprocessor's instructions.
Figure 3:
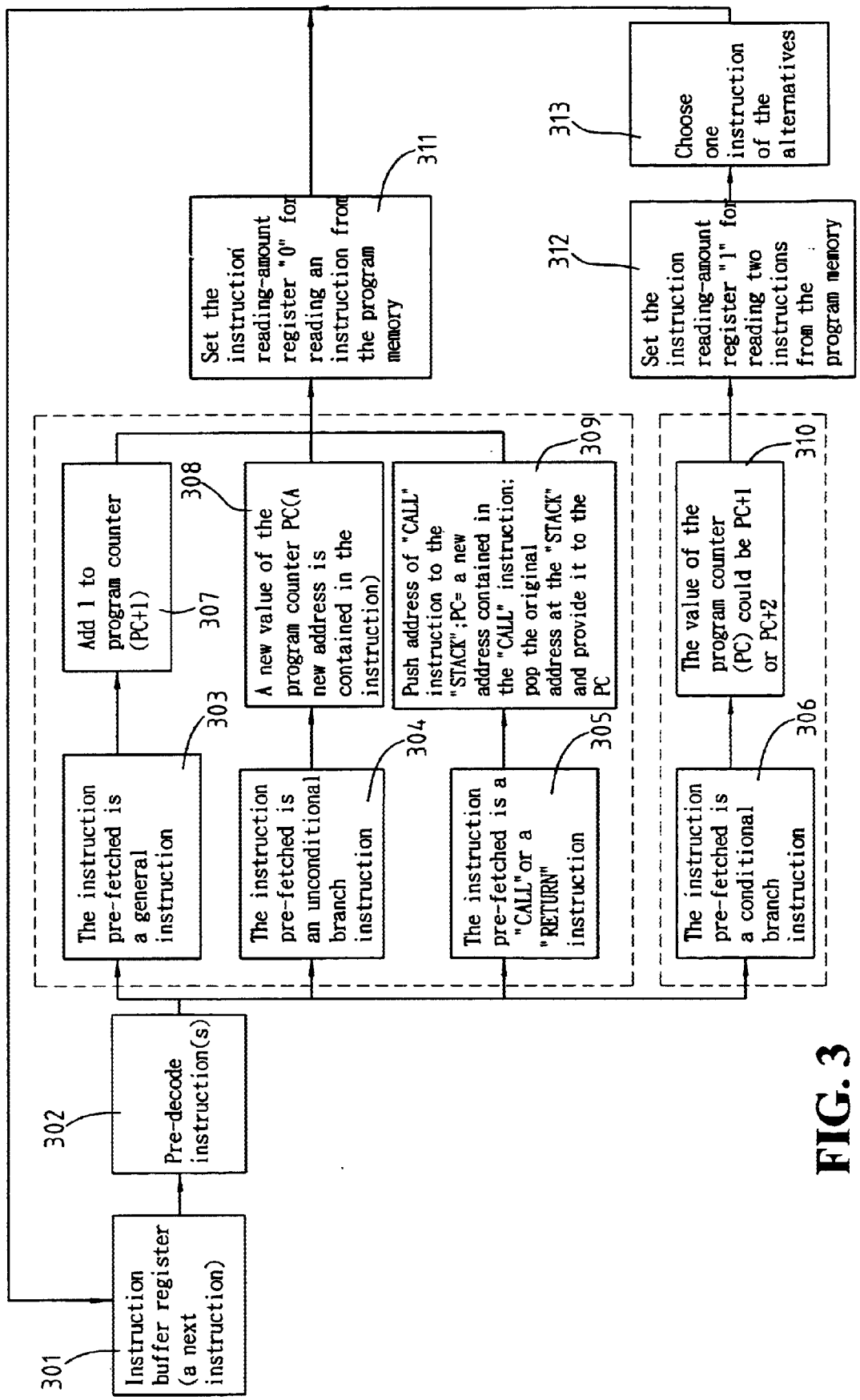
FIG. 3 is a flowchart of a method of this invention for reading microprocessor's instructions.

As shown in FIG. 3, in running a program, the method of this invention shall choose one of four options after execution of a buffer step 301 and a pre-fetching step 302. If the next instruction is decoded and found a general logic instruction 303 for example, the procedure of this method is to add 1 to the PC value (namely, PC+1) 307 and set an instruction reading-amount register in a state for fetching a next instruction only 311. If it is found an unconditional branch instruction 304, the PC will point to a new address 308 and set the instruction reading-amount register in a state for fetching an instruction 311. If it is found a "CALL" or a "RETURN" instruction 305, the PC will point to a new address 309 and set the instruction reading-amount register in a state for fetching a specified instruction only 311, or if it is found a conditional branch instruction 306, the PC will point to a next (PC+1) and then a further next address 310 (PC+2) and set the instruction reading-amount register in a state for fetching two instructions 312 for the processing unit to choose and execute one of the alternatives 313.

Figure 4:
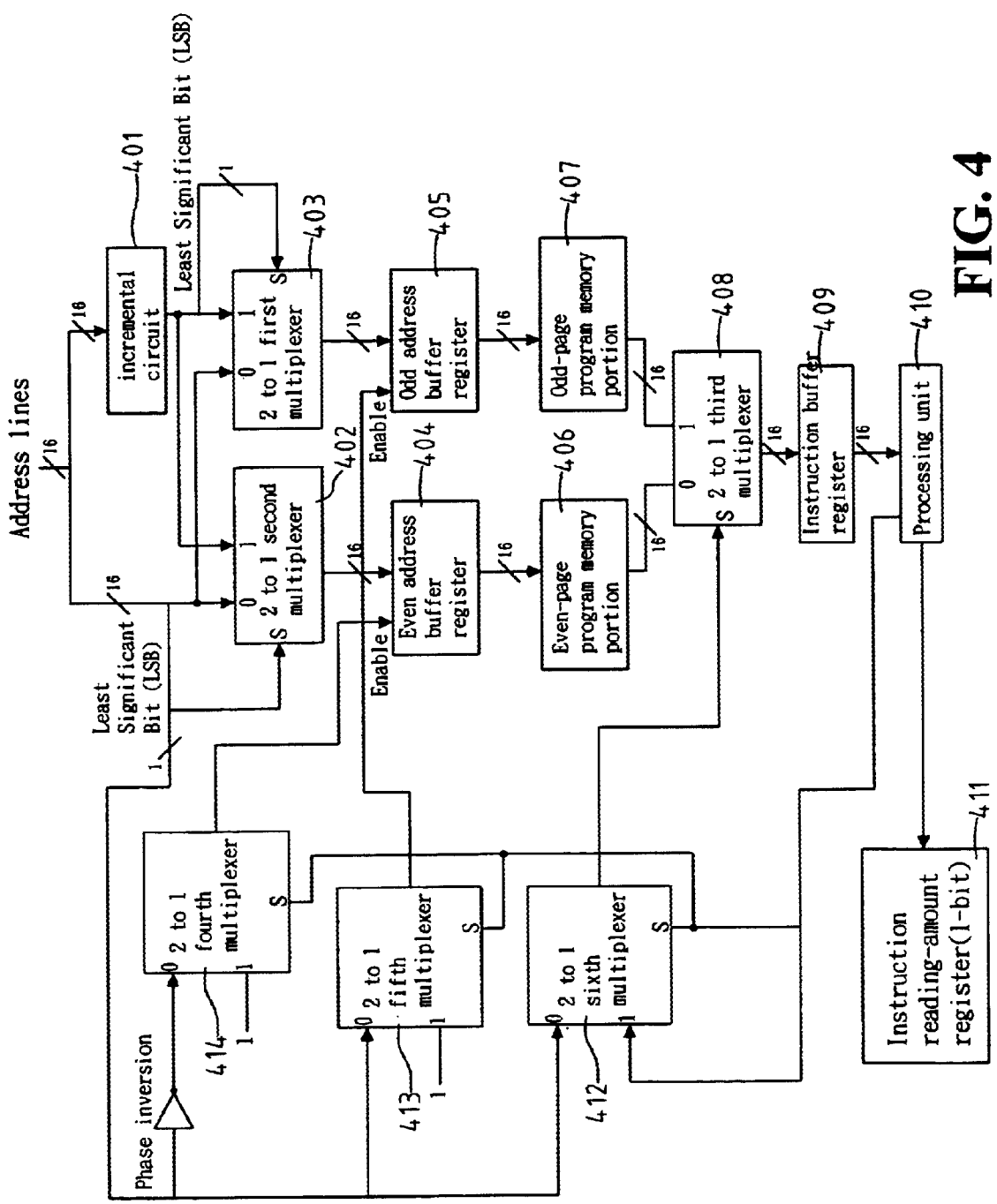
FIG. 4 is an embodiment of the method of this invention for fetching microprocessor's instructions.

FIG. 4 is an architecture embodiment of the method of this invention for fetching microprocessor's instructions. In FIG. 4, by taking advantage of an instruction reading-amount register 411, which is set to binary "1" for reading two instructions when a processing unit 410 has pre-fetched and pre-decoded a conditional branch instruction, namely, the method will read two instructions instead of one in the next instruction cycle. On the contrary, the instruction reading-amount register 411 is set to binary "0" for reading one instruction when the processing unit 410 has pre-fetched the next instruction and found it in a form other than the conditional branch.

The program memory module of this invention is divided into an odd-page and an even-page program memory portion 407, 406. As soon as an odd or an even address buffer register 405, 404 is enabled, the odd-page or the even-page program memory portion 407, 406 will be chosen and read by an instruction buffer register 409. Regarding detailed operation, several examples are described below.

As shown in FIG. 4, an incremental circuit 401 increments the value of the address lines. Both the address lines and the output of the incremental circuit 401 are connected to multiplexers 402, 403. The selection switch of multiplexer 402 is connected to the least significant bit (LSB) of the address lines to control the output of the multiplexer 402. The selection switch of multiplexer 403 is connected to the least significant bit (LSB) of the output of the incremental circuit 401 to control the output of the multiplexer 403.

The outputs of the two multiplexers 402, 403 are sent to the even and odd address buffer registers 404, 405 respectively. Multiplexers 414, 413 control the two address buffer registers 404, 405 respectively for the fetching of even-page and odd-page program memory portions 406, 407. A multiplexer 408 which is controlled by the multiplexer 412 selects either even-page or odd-page program memory 406, 407 output and sends it to the instruction buffer register 409 for execution in the processing unit 410.

In a first example, the instruction reading-amount register is "0" and the address lines have a value "10". As a result, multiplexers 402 and 403 output address values "10" and "11" respectively based on their respective selection switches. The even address buffer register 404 is enabled by the multiplexer 414 to fetch the even-page program memory portion 406 and send the fetched instruction to the instruction buffer register 409 through the multiplexer 408.

In a second example, the instruction reading-amount register is "0" and the address lines have a value "11". As a result, the multiplexer 402 chooses the incremented address value "12" while the multiplexer 403 chooses the address value "11". The odd address buffer register 405 is enabled by the multiplexer 413 to fetch the odd-page program memory portion 407 and send the fetched instruction to the instruction buffer register 409 through the multiplexer 408.

In a third example, the instruction reading-amount register is "1" and the address lines have a value "11". In this case, the multiplexer 402 chooses the address "12" while the multiplexer 403 chooses the address "11", and both the odd and the even address buffer registers 405, 404 are enabled to make the odd-page and the even-page program memory readable. The address chosen by the instruction buffer register 409 is determined by the processing unit 410 because the selection switch "S" of the multiplexer 412 is controlled by the processing unit 410.

The operation manner of this invention is described below in connection with a program example shown in FIG. 5.

Figure 5:
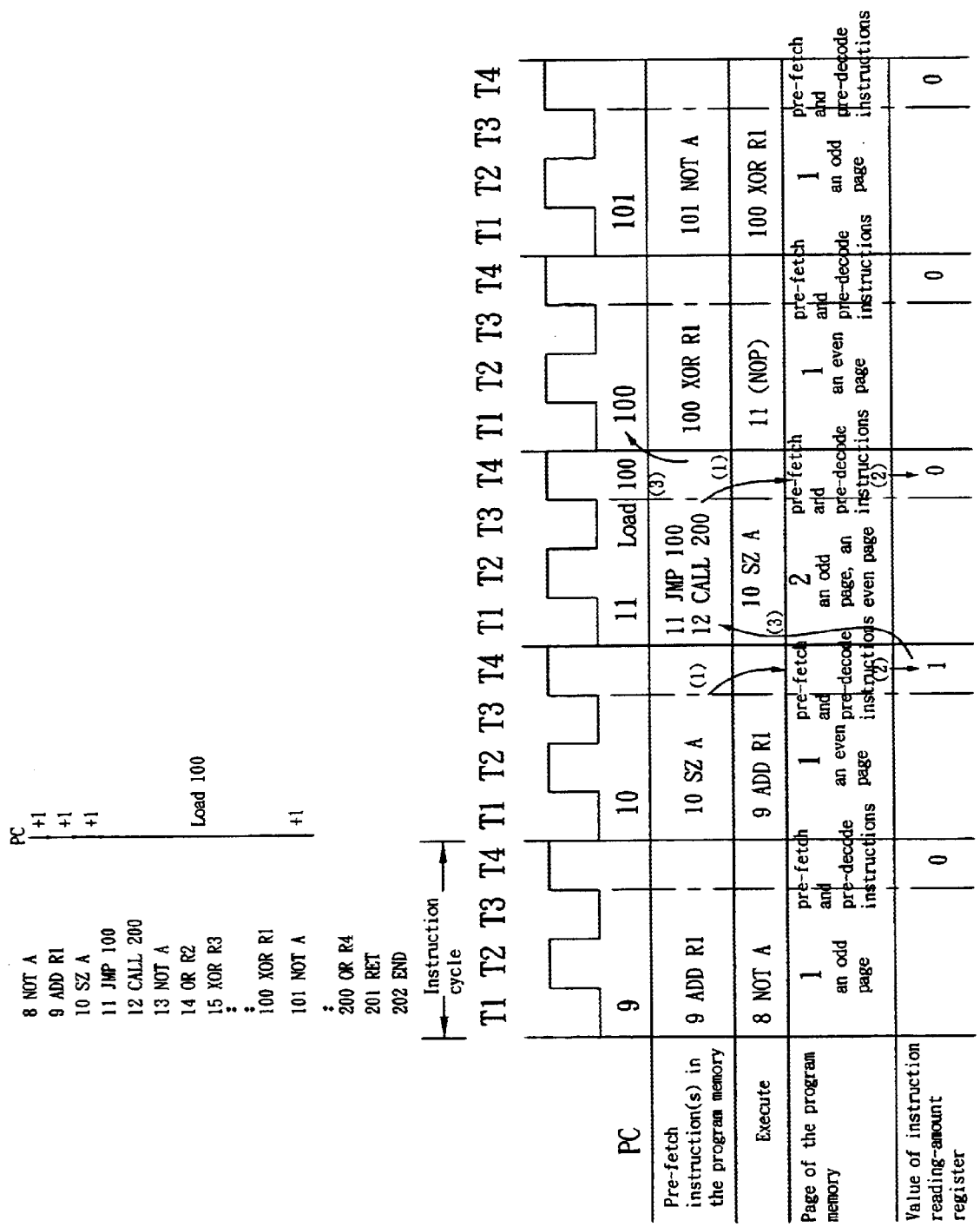
FIGS. 5 and 6 are timing charts of the method of this invention for fetching microprocessor's instructions.

FIG. 5 shows an example of executing a program according to the method of this invention. In processing a conditional branch instruction at PC address 10, the program pre-fetches an unconditional brunch instruction at PC address 11, and when processing the unconditional branch instruction, the program pre-fetches an instruction at a next address. Referring to the timing chart of FIG. 5, when the instruction at address 9 is executed and the pre-fetched next instruction at address 10 is decoded as a conditional branch instruction for example, the instruction reading-amount register is set to "1" so that two following instructions at address 11 and 12 will be pre-fetched when the instruction at address 10 is executed. If the instruction at address 11 is chosen and found by the processing unit as an unconditional branch instruction to be executed next, the instruction reading-amount register is set to "0". In the next instruction cycle, the instruction at address 11 is substituted by no operation (NOP). Then the instruction at a new address 100 is fetched and decoded as a general logic instruction and the instruction reading-amount register is set to "0" for execution of that instruction corresponding to the address 100 in the next instruction cycle. Meanwhile, the next instruction at address 101 of the program memory is pre-fetched and decoded.

Figure 6:
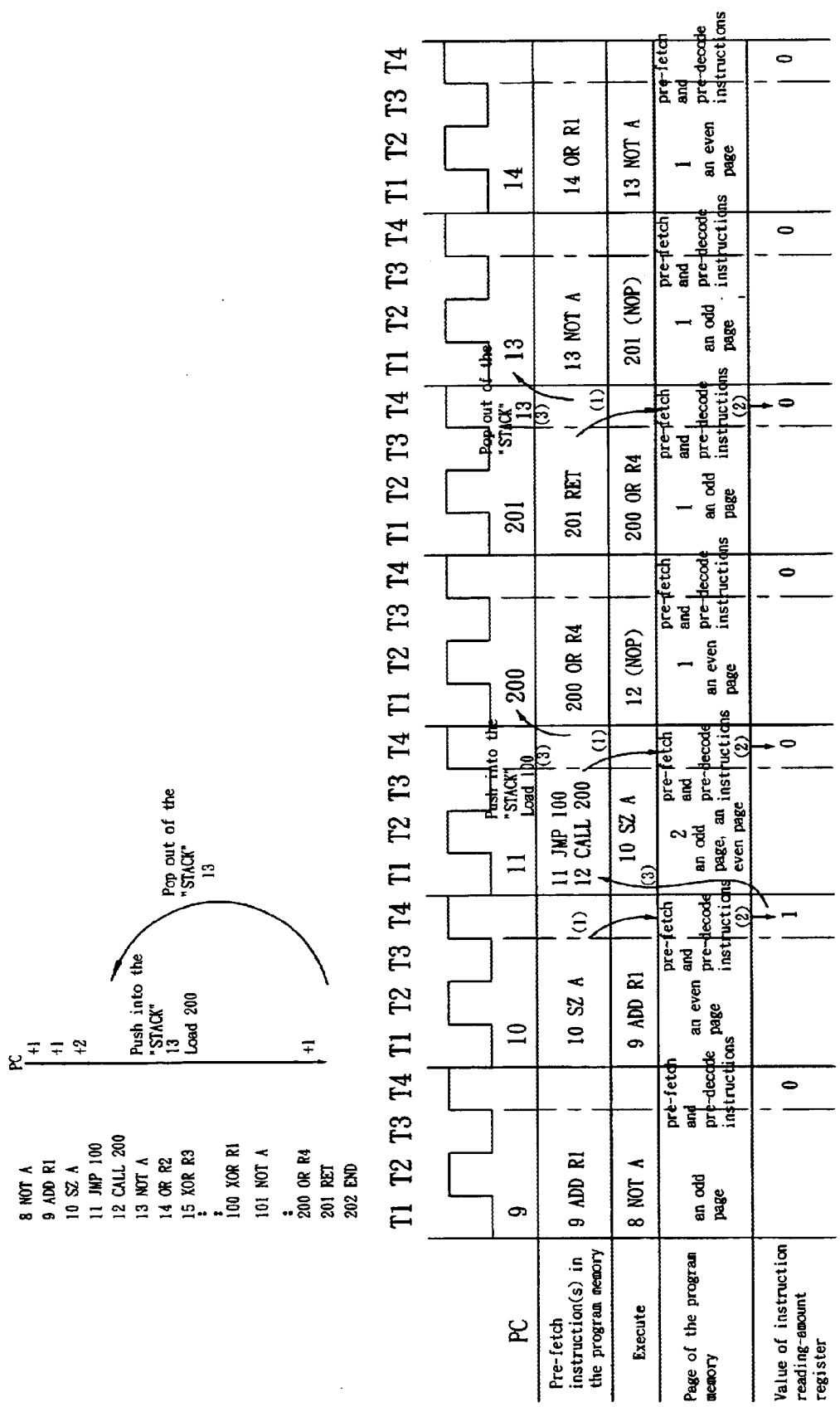

The program example in FIG. 6 is almost the same as that in FIG. 5, except that the conditional branch instruction chosen in this case is a "CALL" or a "RETURN" instruction at address 12. In the instruction cycle at the PC address 200, the instruction at address 12 is substituted by NOP, and the instruction at a new address 200 is fetched and decoded as a general logic instruction. Thus, the instruction reading-amount register is set to "0" and the instruction at the address 200 will be executed in the next instruction cycle. The instruction at address 201 is pre-fetched and interpreted as a return instruction, and in the next instruction cycle, the instruction at address 201 is substituted by NOP, then the instruction at the return address 13 is pre-fetched and decoded.

According to the above description, it is understood that reading two instructions is necessary only when a pre-fetched instruction is a conditional branch one, otherwise (about 80%) only one instruction has to be pre-fetched so as to avoid reading unnecessary program memory for reducing power consumption.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A method for reading microprocessor's instructions, comprising the steps of:

executing a current instruction, pre-fetching and pre-decoding a next instruction following the current instruction in a current instruction cycle; and setting an instruction reading-amount register to a first state if the next instruction pre-decoded is a conditional branch instruction, and otherwise setting the instruction reading-amount register to a second state, said conditional branch instruction having a branched target in one of the two succeeding instructions after said conditional branch instruction;

wherein the two succeeding instructions after the next instruction are pre-fetched in a next instruction cycle if the instruction reading-amount register is in a first state, and otherwise one instruction is pre-fetched in the next instruction cycle.

2. The method for reading microprocessor's instructions as claimed in claim 1, wherein a program counter contains an address value, and the address value is increased by 1 for pre-fetching an instruction in the next instruction cycle if the next instruction is pre-decoded to be a general logic instruction, a new address value contained in the next instruction is loaded to the program counter if the next instruction is pre-decoded to be an unconditional branch instruction, a new address value contained in the next instruction is loaded to the program counter if the next instruction is pre-decoded to be a CALL instruction, and a new address is popped from a stack and loaded to the program counter if the next instruction is pre-decoded to be a RETURN instruction.

3. The method for reading microprocessor's instructions as claimed in claim 1, wherein a binary value 1 or 0 is set in the instruction reading-amount register to represent the first or second state for pre-fetching two instructions or one instruction in the next instruction cycle.

4. An architecture for reading microprocessor's instructions, comprising:

a plurality of address lines having an address value;

an incremental circuit for incrementing said address value;

a first multiplexer controlled by a least significant bit of the incremented address value for selecting either the address value of the address lines or the incremented address value to output an odd address;

a second multiplexer controlled by a least significant bit of the address value of the address lines for selecting either the address value of the address lines or the incremented address value to output an even address;

an odd address buffer register for buffering the odd address from the first multiplexer;

an even address buffer register for buffering the even address from the second multiplexer;

an odd-page memory portion addressed by the odd address buffered in the odd address buffer register for outputting an instruction stored in the odd-page memory portion;

an even-page memory portion addressed by the even address buffered in the even address buffer register for outputting an instruction stored in the even-page memory portion;

a third multiplexer for selecting the instruction from either the odd-page memory portion or the even-page memory portion;

an instruction buffer register for buffering the instruction selected by the third multiplexer;

a fourth multiplexer for enabling the even address buffet register to access the even-page memory portion based on an inverted value of the least significant bit of the address lines;

a fifth multiplexer for enabling the odd address buffer register to access the odd-page memory portion based on the least significant bit of the address lines;

a sixth multiplexer for controlling the third multiplexer based on the least significant bit of the address lines to select the instruction from the odd-page memory portion or the even-page memory portion;

an instruction reading-amount register for indicating an amount of instructions to be pre-fetched; and a processing unit for executing arithmetic logic operations, controlling, and pre-fetching one or two instructions from the instruction buffer register;

wherein the processing unit pre-fetches and pre-decodes a next instruction following a current instruction in a current instruction cycle and sets the instruction reading-amount register to a state for pre-fetching one or two instructions in a next instruction cycle.

5. The architecture for reading microprocessor's instructions as claimed in claim 4, wherein the instruction reading-amount register is set to a state for pre-fetching two instructions in the next instruction cycle if the next instruction pre-decoded is a conditional branch instruction.

6. The architecture for reading microprocessor's instructions as claimed in claim 4, wherein the address lines are controlled by a program counter, and the address value of the address lines is increased by 1 for pre-fetching an instruction in the next instruction cycle if the next instruction is pre-decoded to be a general logic instruction, a new address value contained in the next instruction is loaded to the program counter if the next instruction is pre-decoded to be an unconditional branch instruction, a new address value contained in the next instruction is loaded to the program counter if the next instruction is pre-decoded to be a CALL instruction, and a new address is popped from a stack and loaded to the program counter if the next instruction is pre-decoded to be a RETURN instruction.

7. The method for reading microprocessor's instructions as claimed in claim 4, wherein a binary value 1 or 0 is set in the instruction reading-amount register to represent a first or second state for pre-fetching two instructions or one instruction in the next instruction cycle.

* * * * *